March 29, 1932.   A. J. DAVIS   1,851,002
CREAM SALVAGING AND UTENSIL CLEANSING APPARATUS
Filed Dec. 28, 1929   3 Sheets-Sheet 1
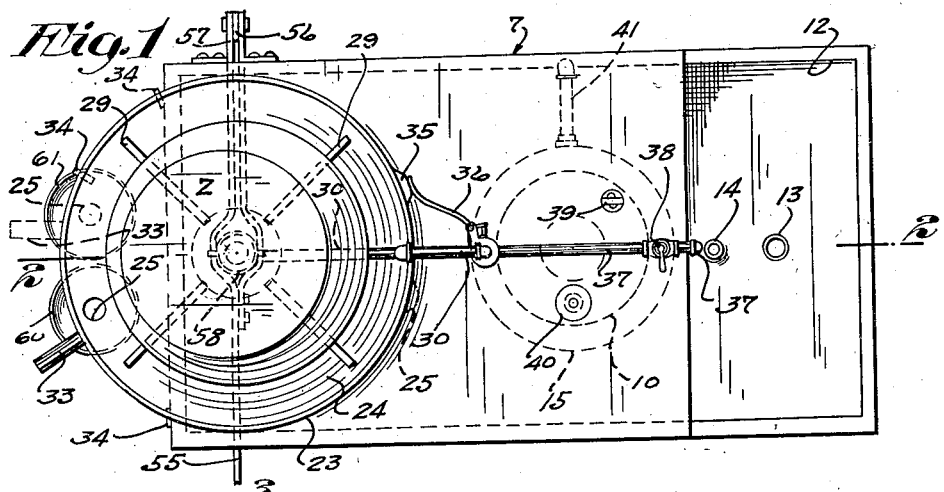
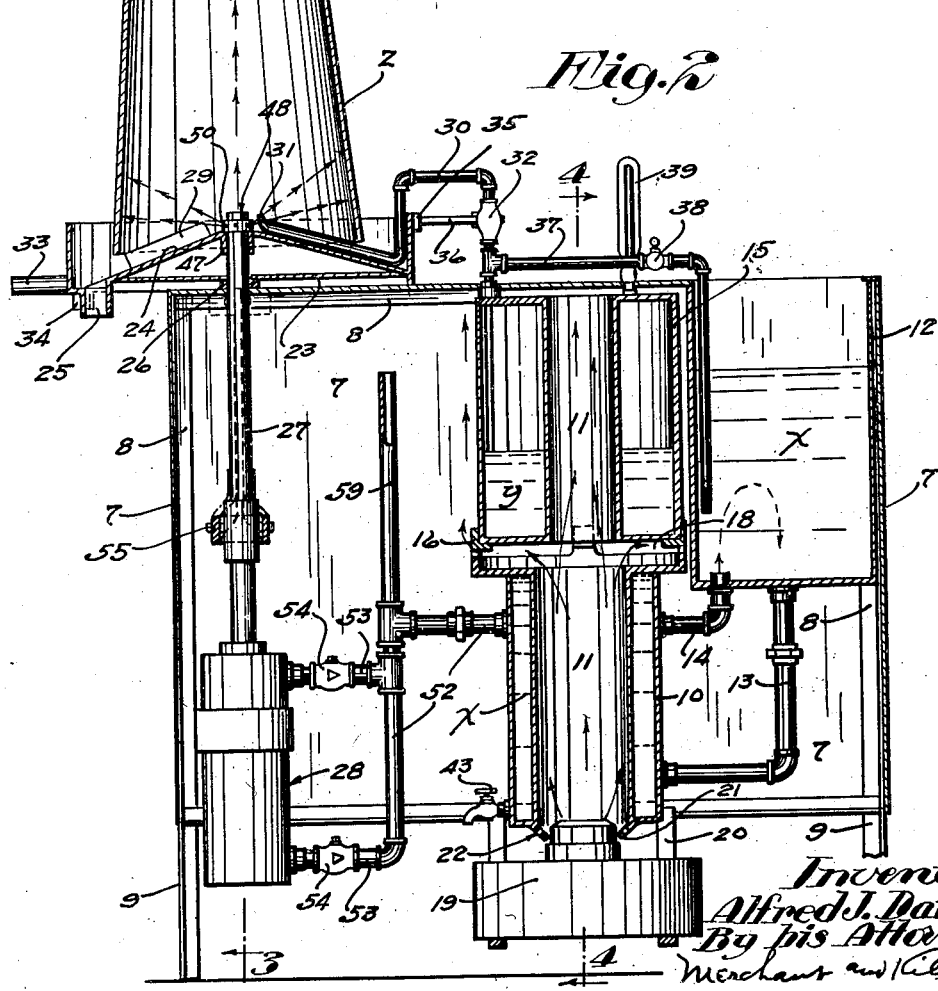

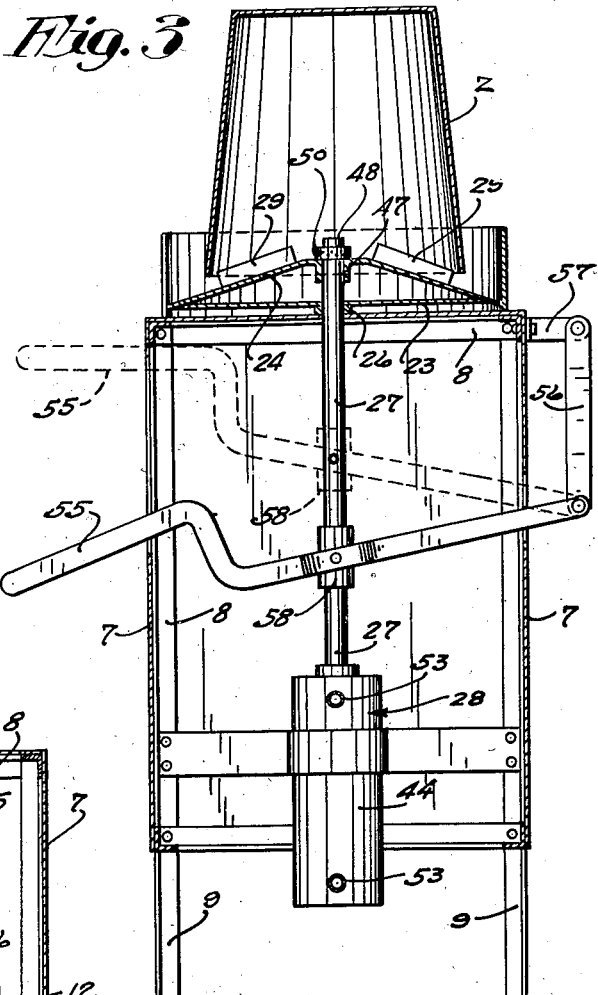
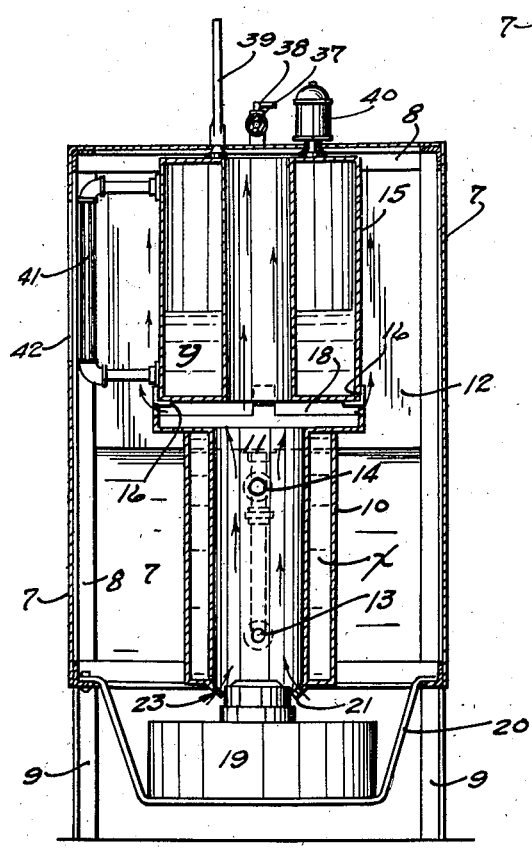

March 29, 1932. A. J. DAVIS 1,851,002
CREAM SALVAGING AND UTENSIL CLEANSING APPARATUS
Filed Dec. 28, 1929  3 Sheets-Sheet 3
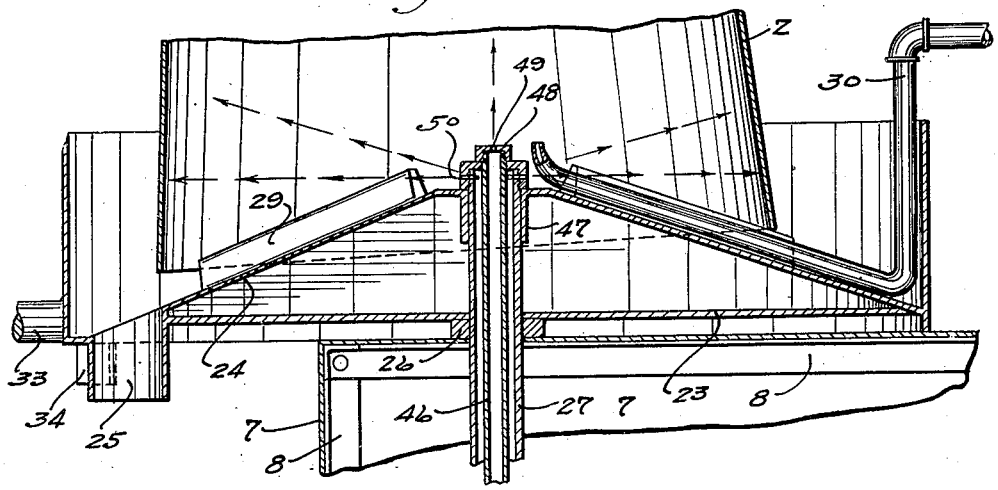
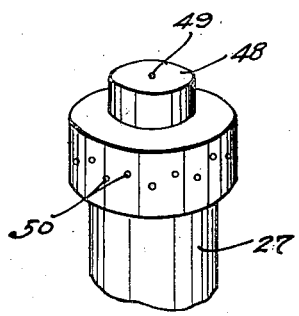
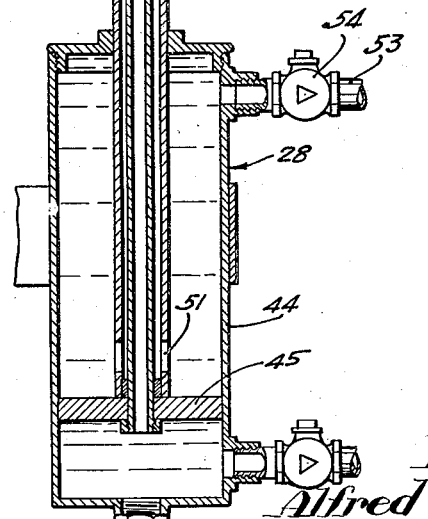
Inventor
Alfred J. Davis
By his Attorneys Patented Mar. 29, 1932

1,851,002

UNITED STATES PATENT OFFICE

ALFRED J. DAVIS, OF MINNEAPOLIS, MINNESOTA

CREAM SALVAGING AND UTENSIL CLEANSING APPARATUS

Application filed December 28, 1929. Serial No. 417,140.

My present invention has for its object the provision of a simple and highly efficient apparatus for salvaging materials adhering to the walls of a can or other receptacle, after the contents thereof have been emptied, and thereafter washing and sterilizing said can or receptacle.

While capable of more general use, the present apparatus has been especially designed and is particularly adapted for removing cream from cans, pails, milking machines and the like and for collecting the same unadulterated and in a sanitary condition and thereafter cleansing and sterilizing the utensil.

Generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the improved apparatus;

Fig. 2 is a view principally in longitudinal central section taken on the line 2—2 of Fig. 1;

Fig. 3 is a view partly in elevation and partly in transverse vertical section taken on the line 3—3 of Fig. 2;

Fig. 4 is a view partly in elevation and partly in transverse vertical section taken on the line 4—4 of Fig. 2;

Fig. 5 is a fragmentary view principally in longitudinal central section taken centrally through the utensil holder nozzle and pump, on an enlarged scale; and Fig. 6 is a perspective view of the jetting head.

The numeral 7 indicates a rectangular sheet metal casing having a closed top and an open bottom and suitably reinforced by an internal angle bar frame 8 having legs 9 which support said casing in an elevated position. Mounted in the casing 7, at substantially the center thereof, is an upright closed tank 10 comprising concentric inner and outer shells that are radially spaced relatively close together for holding a cleansing liquid X to be heated. The diameter of the inner shell of the tank 10 is relatively large and affords the lower section of a chimney flue 11. This tank 10 is automatically filled with the liquid X from a supply reservoir 12 through a pipe 13 which leads from the bottom of said reservoir to the tank 10 near the bottom thereof. To permit the liquid X to circulate while being heated intake and return pipes 14 connect the tank 10 and reservoir 12. The reservoir 12 is mounted in the casing 7 near the top thereof and above the tank 10 so that the liquid X in said reservoir is gravity fed into the tank 10.

A cylindrical low pressure steam boiler 15 is mounted over the tank 10 in axial alignment therewith and comprises concentric inner and outer shells radially spaced the one from the other. The inner shell of the steam boiler 15 is of a smaller diameter than the inner shell of the tank 10 and affords the upper or contracted section of the chimney flue 11. Said steam boiler 15 is of a diameter considerably larger than that of the tank 10 and is supported on a plurality of circumferentially spaced bearing lugs 16 integrally formed with an upstanding annular flange 17 on the periphery of the top of the tank 10 which is expanded to a diameter slightly greater than that of said boiler. The lugs 16 support the steam boiler 15 above the top of the tank 10 to leave heat passageways 18 between said boiler and the flange 17, which lead from the lower section of the chimney flue 11 to the exterior of the boiler 15.

An oil lamp 19 is provided for heating the cleansing liquid X to or substantially the boiling point and for heating water Y in the boiler 15 to create steam. This lamp 19 is removably held suspended under the tank 10 by a pair of U-shaped brackets 20 attached to the frame 8, with its oil receptacle directly supported on said brackets and with the burner proper extending into the lower end of the chimney flue 11. At least one of the brackets 20 is made displaceable so that the oil lamp 19 may be removed for the purpose of filling and cleaning the same. On the lower end of the tank 10 is a downwardly and inwardly converging annular flange 21 that closely surrounds the burner of the lamp 19 and is provided with a plurality of circumferentially spaced air intake holes 22 through which a sufficient supply of air is delivered to the oil lamp 19 for proper combustion.

As the column of cleansing liquid in the tank 10 is relatively thin, the same will be heated very quickly from heat produced by the oil lamp 19 and which heat comes into direct contact with the inner shell of said tank. Due to the contracted diameter of the upper section of the chimney flue 11 the upwardly moving heat in the lower section of said flue will be divided and part thereof will continue upward through the flue 11 and the part thereof coming into contact with the bottom of the steam boiler 15 will be directed outward through the passageways 18 and travel upward around the outer shell of said boiler. It will thus be seen that heat from the oil lamp 19 will come in direct contact to the inner and outer shells of the steam boiler 15 thereby causing the water Y therein to heat very quickly.

Pails, cans and other utensils from which cream is to be salvaged and thereafter cleansed and sterilized are placed one at a time in an inverted position on an annular combined holder and catch basin 23 mounted to turn about a substantially vertical axis. For the sake of brevity the combined holder and catch basin 23 will hereinafter be referred to as a catch basin and the utensil Z on the catch basin 23 is a pail. The catch basin 23 is in the form of an annular pan having a false conical bottom 24 which is slightly tilted to cause the liquid contents on said bottom to be collected and run to the lower side thereof. Extending through the catch basin 23 at the lower side of its false bottom 24 is a short depending drain spout 25. Said catch basin 23 is supported on a bearing 26 on the top of the casing 7 and is turnably mounted on the outer upright tubular piston rod 27 of a double-acting cylinder and piston pump 28 and which rod is free to be reciprocated axially through said catch basin. Secured to the false bottom 24 are a plurality of radially extended cleats 29 on which the utensil Z loosely rests and is supported thereby above said bottom for the escape of steam, cream and cleansing liquid thereunder.

Leading from the steam boiler 15 at the top thereof is a main steam pipe 30 the delivery end portion of which rests on the false bottom 24, extends radially thereon to a point near the axis thereof and has on its delivery end an upturned nozzle 31 arranged to discharge a jet of steam axially upward in the utensil Z. This steam pipe 30 is normally closed by a spring-actuated needle valve 32 interposed in said pipe near the intake thereof.

A radial handle 33 on the catch basin 23 affords means by which said catch basin may be turned and a pair of circumferentially spaced stop lugs 34 on the bottom of said catch basin are arranged to alternately engage the casing 7 as an abutment and limit the turning movement of said catch basin. To automatically open the needle valve 32 the same is provided with an operating lever 36 arranged to be engaged by a cam block 35 on the rim of the catch basin 23 when said catch basin is positioned, as shown in Fig. 1.

As an auxiliary heater for the cleansing liquid X a branch steam pipe 37 leads from the main steam pipe 30 between the steam boiler 15 and valve 32 with its delivery end portion extending downward into the reservoir 12 and terminates near the bottom thereof for the discharge of live steam into the body of cleansing liquid X therein. A shut-off valve 38 is interposed in the branch steam pipe 37 above the reservoir 12. On the top of the steam boiler 15 is a steam pressure gauge 39 and blow-off valve 40 and on the side of said boiler is a water gauge 41 which may be read through a sight opening 42 in the casing 7. The steam pressure gauge 39 is removable and normally closes an opening in the top of the steam boiler 15 through which water may be poured to fill said boiler. A valve 43 in the tank 10 near the bottom thereof affords means by which said tank may be drained.

Referring again to the double-acting pump 28, the numeral 44 indicates the cylinder thereof which is rigidly secured to the frame 8 and the numeral 45 indicates its piston. In addition to the outer piston rod 27 the piston 45 is also provided with an inner tubular piston rod 46 which extends axially through the piston rod 27 and is radially spaced therefrom for the flow of the cleansing liquid X between said two piston rods. The outer piston rod 27 slidably works through the head of the cylinder 44, bearing 26 and a depending sleeve bearing 47 on the false bottom 24 at the apex thereof.

Applied to the upper end of the piston rods 27 and 46 and rigidly connecting the same is a jetting head or nozzle 48 which closes said two rods in respect to each other. Formed in the jetting head 48 at the axis thereof is a single discharge orifice 49 leading from the tubular piston rod 46 and arranged to discharge a jet vertically upward at the center of the utensil Z. In the sides of the jetting head 48 are formed, as shown, upper and lower rows of discharge orifices 50. These two rows of orifices 50 are staggered and the lower row is arranged to discharge jets from the outer tubular piston rod 27 substantially in a horizontal plane and the upper row of said orifices are arranged to discharge jets obliquely upward thereof, as indicated by the arrows in Fig. 5. Intake ports 51 are formed in the outer piston rod 27 close to the piston 45.

The hot cleansing liquid X in the tank 10 is delivered from the top of said tank to the pump 28 through a pipe 52 having at its delivery end portion upper and lower branch pipes 53 which lead to the pump cylinder 44, the former above the piston 45 and the latter below the same. A check valve 54 is interposed in each branch pipe 53. The piston 45 and its rods 27 and 46 are reciprocated by a hand lever 55 fulcrumed to the lower end of a depending link 56 and intermediately pivoted to the outer piston rod 27. Said link 56 is pivoted to a bearing 57 on the casing 7 at the top thereof. The lever 55 is provided with a central passageway through which the outer piston rod 27 extends and the spaced sides of said lever at the piston rod 27 are pivoted on a pair of axially aligned trunnions on a collar 58 rigidly secured to said piston rod. The conduit 52 is provided with an air vessel 59 in the form of a vent pipe.

*Operation*

The operation of the above described apparatus may be briefly described as follows:

It may be assumed that the water Y in the boiler 15 is sufficiently hot to produce low pressure steam and that the cleansing liquid X has been heated to the desired temperature for sterilization. It may be further assumed that a utensil is supported on the catch basin 23 from which adhering cream is to be removed and thereafter said utensil cleansed and sterilized and that said catch basin is positioned, as indicated by broken lines in Fig. 1. In this dotted line position of the catch basin 23, the cam block 35 is out of engagement with the lever 36 and the needle valve 32 closed. The first operation is to swing the catch basin 23 by means of its handle 33 into its full line position, as shown in Fig. 1, to bring the cam block 35 into engagement with the lever 36 and operate the same to open the needle valve 32 for the escape of steam from the boiler 15 through the pipe 30 to the nozzle 31 from which it is discharged into the inverted utensil Z. This live steam will cause the adhering cream to loosen from the walls of the utensil Z, flow downward therefrom and be collected in the catch basin 23 where the same is discharged through the drain spout 25 into a can or other receptacle 60 placed thereunder. After the removal of the adhering cream from the utensil Z the catch basin 23 is turned into its dotted line position, shown in Fig. 1, to move the cam block 35 out of engagement with the lever 36 and allow the needle valve 32 to close and cut off the steam supply. The hand lever 53 is then manipulated to reciprocate the piston 45 and its rods 27 and 46.

During the upstroke of the piston 45 its rods 27 and 46 are moved axially upward in the utensil Z and the cleansing liquid X is drawn from the tank 10 into the pump cylinder 44 below the piston 45 through the lower branch pipe 53 and is forced from said cylinder above the piston 45 upward in the tubular piston rod 27 and through the orifices 50 in the jetting head 46, as indicated by radial arrows in Fig. 5. During the down stroke of the piston 45 the cleansing liquid X is drawn from the tank 10 into the pump cylinder 44 above the piston 45 through the upper branch pipe 53 and forced upward through the tubular piston rod 46 and out of the single orifice 49 in the jetting head 48, as indicated by arrows in Fig. 5. The jet of the cleansing liquid X discharged from the orifice 49 will strike the bottom of the utensil Z, flow outward thereon and down the side walls of said utensil and into the catch basin 23 where the same is collected and discharged therefrom through the drain spout 25 into a receptacle 61 placed thereunder. The reciprocating movement of the piston rods 27 and 46 causes the jetting head 48 to move up and down in the utensil Z.

At the beginning of the down stroke of the piston 45, said head is in its uppermost position and close to the bottom of the utensil Z so that the jet of cleansing liquid X discharged from the orifice 49 has at this time its greatest force and will thoroughly cleanse and sterilize the bottom portion of said utensil. During the downward movement of the jetting head 48 the jet from the orifice 49 will continue to strike the bottom of the utensil Z and flow outward thereof and down the sides of said utensil. At the beginning of the upstroke of the piston 45 the jetting head 48 will be in its lowermost position and the jets of the cleansing liquid X discharged from the orifice 50 will strike the sides of the utensil Z at a multiplicity of circumferentially and axially spaced points, and these points will constantly change as the jetting head 48 is moved up in said utensil.

By the use of steam cream that naturally adheres to a utensil and any cream that might be frozen thereon will be kept in an unadulterated and sanitary condition. The turning of the catch basin 23 from one extreme position to the other, which is governed by the stop lugs 34, always positions the drain spout 25 over either one of the receptacles 60 or 61.

By turning the catch basin 23 into its full line position, as shown in Fig. 1, the cam block 35 engages the lever 36 and open the needle valve 32, and this movement of the catch basin 23 automatically positions its drain spout 25 over the receptacle 60 to receive cream collected in said catch basin. When the catch basin 23 is turned into its dotted line position the cam lug 35 is moved out of engagement with the lever 36 and permit the needle valve 32 to close and when the catch basin 23 is turned into this position its drain spout 25 is automatically positioned over the receptacle 61 to receive the cleansing liquid X collected by said catch basin. It will thus be seen that it is impossible, either by accident or design, to mix the cream and cleansing liquid by discharging the same from the catch basin 23 into the wrong receptacle under the drain spout 25.

What I claim is:

1. An apparatus of the class described, comprising a utensil holder, a cylinder and piston pump, a tubular piston rod on the piston of said pump and open to the cylinder having on its outer end a nozzle, said piston rod being arranged for movement longitudinally in a utensil on the holder, and means for reciprocating the piston and its rod.

2. An apparatus of the class described comprising a utensil holder, a double-acting cylinder and piston pump, the piston of said pump having concentric inner and outer tubular piston rods radially spaced the one from the other, said piston rods having on their outer ends a nozzle, said nozzle having an axial orifice leading from the inner piston rod and a multiplicity of circumferentially spaced radial orifices leading from the outer piston rod, said piston rods being arranged to move longitudinally in a utensil on the holder, and means for reciprocating the pump piston and its piston rods.

3. An apparatus of the class described comprising a utensil holder, a double-acting cylinder and piston pump, a tank for holding a cleansing liquid, means for heating the liquid in the tank, conduits leading from the tank to the cylinder, one on each side of the piston, a check valve in each conduit, the piston of said pump having concentric inner and outer piston rods radially spaced, the one from the other, a nozzle on the outer ends of the piston rods, said nozzle having an axial orifice leading from the inner piston rod and a multiplicity of circumferentially spaced radial orifices leading from the outer piston rod, and means for reciprocating the piston and its rods.

4. The structure defined in claim 3 in which the tank is in the form of an upright cylinder, the axial passageway through the tank affording a chimney flue, and in which the means for heating the liquid in the tank is an oil lamp positioned at the lower end of the chimney flue.

5. The structure defined in claim 3 in further combination with a reservoir for holding a supply of cleansing liquid, and intake and discharge conduits connecting the reservoir and tank for the circulation of the cleansing liquid during the heating thereof.

6. The structure defined in claim 3 in further combination with a reservoir for holding a supply of cleansing liquid, and intake and discharge conduits connecting the reservoir and tank for the circulation of the cleansing liquid during the heating thereof, said reservoir being above the tank to gravity feed the cleansing liquid to the tank.

7. The structure defined in claim 3 in further combination with a reservoir for holding a supply of cleansing liquid, and intake and discharge conduits connecting the reservoir and tank for the circulation of the cleansing liquid during the heating thereof, and auxiliary means for heating the cleansing liquid in the reservoir.

8. An apparatus of the class described comprising a utensil holder, a source of steam supply including a steam conduit leading therefrom and having a nozzle arranged to discharge into a utensil on the holder, tank for holding a cleansing liquid, a conduit leading from the tank and having a nozzle arranged to discharge into said utensil, a reservoir for supplying the tank with a cleansing liquid, and means for heating the cleansing liquid in the tank, said steam conduit having a branch conduit extending into the reservoir for heating the cleansing liquid therein.

9. An apparatus of the class described, comprising a catch basin having a drain, means for supporting a utensil over the catch basin, said catch basin being mounted for movement into two positions to change the location of its drain, a source of steam supply having a normally closed shut-off valve and a nozzle arranged to discharge steam into a utensil supported over the catch basin, a source of supply for a cleansing liquid including a nozzle arranged to discharge cleansing liquid under pressure into said utensil, and connections actuated by the catch basin when moved into one of its positions to open said valve and for permitting said valve to close when moved into its other position.

10. An apparatus of the class described, comprising a catch basin having a drain, means for supporting a utensil over the catch basin, said catch basin being mounted for movement into two positions to change the location of its drain, a source of steam supply having a yieldingly and normally closed shut-off valve, said valve having an actuating lever, and a cam on the catch basin arranged to operate said lever when the catch basin is moved into one of its positions to open the valve and to release said lever and allow the valve to close when moved into its other position.

11. An apparatus of the class described, comprising a catch basin having a conical bottom, a drain, and radial cleats on said bottom for supporting a utensil over the catch basin, said catch basin being mounted for movement into two positions to change the location of its drain, a source of steam supply having a yieldingly and normally closed shut-off valve and a nozzle arranged to discharge steam into a utensil supported on said cleats, a cylinder and piston pump, said pump having on its piston a tubular piston rod, a nozzle on the outer end of the piston rod arranged to discharge cleansing liquid into said utensil, said piston rod being arranged to move axially upward through the catch basin at the apex thereof, means for supplying heated cleansing liquid to the pump, means for reciprocating the pump and its piston rod, and connections actuated by the catch basin when moved into one of its positions to open said valve and permitting said valve to close when moved into its other position.

12. An apparatus of the class described comprising a utensil holder, inner and outer tubular conduits, a spraying head to which the conduits are attached and open, said head having a discharge orifice leading from each conduit, means for operating the conduits to reciprocate the spraying head in a utensil on the utensil holder, and means for alternately supplying a cleansing liquid to said conduits under pressure.

13. An apparatus of the class described comprising a utensil holder, a double-acting cylinder and piston pump, the piston of the pump having a piston rod provided at its outer end with a nozzle, means for reciprocating the piston rod in a utensil on the holder, and means for supplying a cleansing liquid to the cylinder of the pump on each side of the piston, said piston rod having two conduits that lead to the cylinder, one on each side of the piston.

In testimony whereof I affix my signature.

ALFRED J. DAVIS.